United States Patent
Sun et al.

(10) Patent No.: US 10,447,694 B2
(45) Date of Patent: *Oct. 15, 2019

(54) IDENTITY VERIFICATION METHOD AND DEVICE

(71) Applicant: Tencent Technology (Shenzhen) Company Limited, Shenzhen, Guangdong (CN)

(72) Inventors: Xiao Sun, Guangdong (CN); Junhong Yan, Guangdong (CN); Yu Wu, Guangdong (CN); Wenjun Chen, Guangdong (CN); Qiang Long, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,095

(22) Filed: May 7, 2018

(65) Prior Publication Data

US 2018/0255058 A1 Sep. 6, 2018

Related U.S. Application Data

(63) Continuation of application No. 14/614,096, filed on Feb. 4, 2015, now Pat. No. 9,998,458, which is a (Continued)

(30) Foreign Application Priority Data

Dec. 31, 2013 (CN) .................. 2013 1 0754440

(51) Int. Cl.
*H04L 29/06* (2006.01)
*H04L 9/32* (2006.01)
*G06F 21/36* (2013.01)

(52) U.S. Cl.
CPC .......... *H04L 63/0876* (2013.01); *G06F 21/36* (2013.01); *H04L 9/32* (2013.01);
(Continued)

(58) Field of Classification Search
CPC ... H04L 63/08; H04L 63/083; H04L 63/0876; H04L 63/102; H04L 9/32; H04L 2463/082
See application file for complete search history.

(56) References Cited

U.S. PATENT DOCUMENTS 8,291,477 B2 * 10/2012 Lunt ................... H04L 51/12
726/4
9,215,277 B2 * 12/2015 Liu ................... H04L 67/104
(Continued)

FOREIGN PATENT DOCUMENTS

CN 1829983 A 9/2006
CN 101047503 A 10/2007
(Continued)

OTHER PUBLICATIONS

Written Opinion received in PCT Application No. PCT/CN2014/082477 dated Oct. 16, 2014.
(Continued)

*Primary Examiner* — Linglan E Edwards
(74) *Attorney, Agent, or Firm* — Brinks Gilson & Lione

(57) ABSTRACT

A method and a device of identity verification are disclosed. The method includes: receiving by a server, an identity verification request sent from a terminal, where the identity verification request contains a specified user identifier; based on a user relationship chain of the specified user identifier, obtaining a verified user information set which includes user's information on the user relationship chain; providing the verified user information set to the terminal in order to subsequently receive returned selected user's information;
(Continued)

determining whether the received selected user's information from the terminal matches the user's information on the user relationship chain; if the selected user's information received matches the user's information on the user relationship chain, confirming that the identity verification being successful. To pass the identity verification, the only requirement is that the selected user's information received from the terminal matches the user's information on the user relationship chain.

20 Claims, 8 Drawing Sheets

Related U.S. Application Data continuation of application No. PCT/CN2014/082477, filed on Jul. 18, 2014.

(52) U.S. Cl.
CPC ........ *H04L 63/083* (2013.01); *H04L 63/0815* (2013.01); *G06F 2221/2103* (2013.01); *H04L 63/102* (2013.01)

(56) References Cited

U.S. PATENT DOCUMENTS

| | | | | |
|---|---|---|---|---|
| 9,264,233 | B2* | 2/2016 | Gunnewig | ............ H04L 9/3226 |
| 2002/0083347 | A1 | 6/2002 | Taguchi | |
| 2005/0216768 | A1 | 9/2005 | Eppert | |
| 2008/0148366 | A1* | 6/2008 | Wahl | ....................... G06F 21/36 726/4 |
| 2011/0047608 | A1 | 2/2011 | Levenberg | |
| 2012/0180115 | A1* | 7/2012 | Maitland | ................. G06F 21/34 726/7 |
| 2012/0210409 | A1 | 8/2012 | Lin et al. | |
| 2012/0266236 | A1* | 10/2012 | Miwa | ....................... G06F 21/36 726/19 |
| 2012/0317631 | A1* | 12/2012 | Assam | .................... H04L 63/08 726/7 |
| 2013/0036461 | A1* | 2/2013 | Lowry | .................... G06F 21/36 726/19 |
| 2013/0179954 | A1* | 7/2013 | Bidare | ................... H04L 63/18 726/7 |
| 2014/0223547 | A1* | 8/2014 | Tse | .......................... G06F 21/31 726/19 |

FOREIGN PATENT DOCUMENTS

| | | |
|---|---|---|
| CN | 101640668 A | 2/2010 |
| CN | 102667793 A | 9/2012 |
| CN | 103076959 A | 5/2013 |

OTHER PUBLICATIONS

International Search Report received in PCT Application No. PCT/CN2014/082477 dated Oct. 29, 2014.
Office Action dated Apr. 13, 2017 for Chinese Application No. 201310754440.1, 11 pages.

* cited by examiner

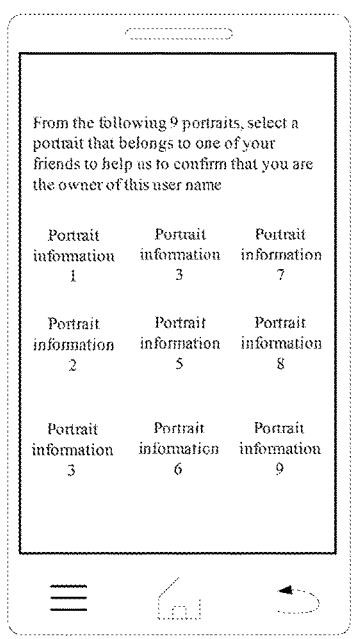
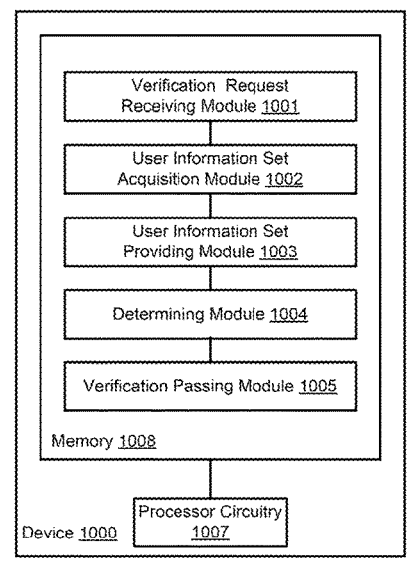
Figure 9
Figure 10 ized as a legitimate user in order to successfully login during identity verification. Further identity verification may be necessary to prevent the above-mentioned problem.

IDENTITY VERIFICATION METHOD AND DEVICE

CROSS-REFERENCE TO RELATED APPLICATIONS

The application is a continuation of U.S. application Ser. No. 14/614,096, filed on Feb. 4, 2015 and titled "AN IDENTITY VERIFICATION METHOD AND DEVICE", which is a continuation of PCT Application No. PCT/CN2014/082477, filed on Jul. 18, 2014, which claims priority to Chinese Patent Application No. 2013107544401, filed on Dec. 31, 2013, all of which are incorporated by reference in their entirety.

FIELD OF THE TECHNOLOGY

The present disclosure relates to the field of network technologies, particularly to an identity verification method and device.

BACKGROUND

Instant messaging software has become an indispensable communication tool in people's daily life. To protect the security of an instant messaging account, a user name and a password are required to match each other as an input during a login in order to pass a login verification. However, accounts are subjected to being hijacked and be disguised as a legitimate user in order to successfully login during identity verification. Further identity verification may be necessary to prevent the above-mentioned problem.

A short message verification code system may be used to perform further identity verification. In a short message verification code system, upon receiving a verification request from a terminal, a server may send a short message verification code to the terminal to be input by a user. If the short message verification code is correct, the identity verification may be successful.

Such identity verification still has at least the following problems: when a short message verification code system is used, if the mobile phone (i.e., terminal) which receives the short message verification code may not be available, identity verification may not be performed. Consequently, a short message verification code system may be applicable to very limited scenarios only, therefore may be too inflexible in other scenarios.

SUMMARY

To solve the problems as described above, various embodiments of the present disclosure may provide an identity verification method and device as follows:

In a first aspect, an identity verification method is provided, the method include at least the following operations: receiving by a server, an identity verification request sent from a terminal, where the identity verification request contains a specified user identifier; based on a user relationship chain of the specified user identifier, obtaining by the server, a verified user information set which includes user's information on the user relationship chain; providing by the server, the verified user information set to the terminal in order to subsequently receive selected user's information returned by the terminal; determining by the server, whether the received selected user's information from the terminal matches the user's information on the user relationship chain; and if the selected user's information received from the terminal matches the user's information on the user relationship chain, confirming by the server, that the identity verification being successful.

In a second embodiment, an identity verification device is provided, which includes: at least a processor with circuitry operating in conjunction with at least a memory storing codes to be executed as a plurality of modules or units to perform functions, wherein the plurality of modules or units may include:

a verification request receiving module, which causes the device to receive an identity verification request sent from a terminal, where the identity verification request contains a specified user identifier;

a user's information set acquisition module, which based on a user relationship chain of the specified user identifier, causes the device to obtain a verified user information set, wherein the verified user information set includes user's information on the user relationship chain;

a user's information set providing module, which causes the device to provide the verified user's information set to the terminal in order to subsequently receive selected user's information returned by the terminal;

a determining module, which causes the device to determine whether the received selected user's information from the terminal matches the user's information on the user relationship chain; and a verification passing module, which causes the device to, if the selected user's information received from the terminal matches the user's information on the user relationship chain, confirm that the identity verification being successful.

Yet another embodiment of the disclosure discloses a non-transitory computer-readable storage medium, wherein the computer readable storage medium stores a program which includes codes or instructions include:

receiving by a server, an identity verification request sent from a terminal, where the identity verification request contains a specified user identifier; based on a user relationship chain of the specified user identifier, obtaining by the server, a verified user information set which includes user's information on the user relationship chain; providing by the server, the verified user information set to the terminal in order to subsequently receive selected user's information returned by the terminal; determining by the server, whether the received selected user's information from the terminal matches the user's information on the user relationship chain; and if the selected user's information received from the terminal matches the user's information on the user relationship chain, confirming by the server, that the identity verification being successful.

The technical solution provided by the embodiments of the present disclosure has the following benefits: a verified user information set containing multiple pieces of user's information is provided on the basis of the user's information on a user relationship chain, and to pass the identity verification, the only requirement is that the selected user's information received from the terminal matches the user's information on the user relationship chain, so it requires little user intervention and is very flexible.

BRIEF DESCRIPTION OF THE DRAWINGS

The accompanying drawings may be included to provide further understanding of the claims and disclosure which may be incorporated in, and constitute a part of this specification. The detailed description and illustrated embodiments described may serve to explain the principles defined by the claims.

FIG. 9 shows an exemplary display interface diagram of a user terminal implementing the identity verification method, according to another embodiment of the present disclosure.

FIG. 10 shows an exemplary structural diagram of an identity verification device, according to an embodiment of the present disclosure.

DETAILED DESCRIPTION

The various embodiments of the disclosure may be further described in details in combination with attached drawings and embodiments below. It should be understood that the specific embodiments described here may be used only to explain the disclosure, and may not be which causes the device to limit the disclosure. In addition, for the sake of keeping description brief and concise, the newly added features, or features which may be different from those previously described in each new embodiment will be described in details. Similar features may be referenced back to the prior descriptions in a prior numbered drawing or referenced ahead to a higher numbered drawing. Unless otherwise specified, all technical and scientific terms herein may have the same meanings as understood by a person skilled in the art.

Figure 1:
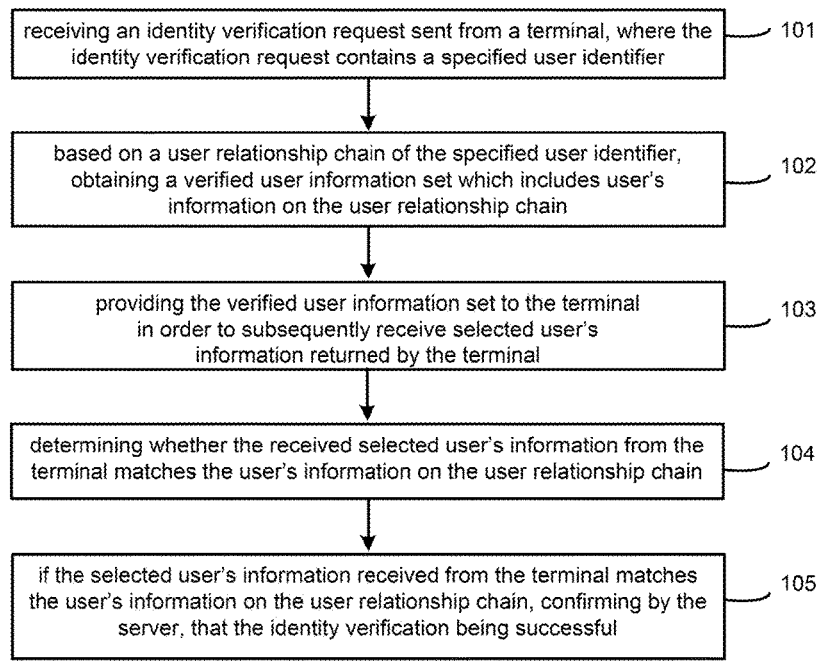
FIG. 1 shows a flowchart of an exemplary identity verification method, according to an embodiment of the present disclosure.

FIG. 1 shows a flowchart of an exemplary identity verification method, according to an embodiment of the present disclosure. In an embodiment, the method may be carried out between a terminal (e.g., terminal (200A) in FIG. 2) and a server (e.g., server (200B) in FIG. 2). The method may include at least the following operations:

Step 101: receiving by a server, an identity verification request sent from a terminal, where the identity verification request contains a specified user identifier. The specified user identifier may be a sequence number randomly assigned by the server of an application with which a user is registered or any other information which identifies the specified user. The user identifier is not limited by the embodiment.

Step 102: based on a user relationship chain of the specified user identifier, obtaining by the server, a verified user information set which includes user's information on the user relationship chain. The user relationship chain may be a unidirectional, bidirectional, or multi-directional relationship between users. More specifically, each user relationship chain may contain multiple user identifiers and each user's information may correspond to a respective user identifier. The verified user information set may contain the user's information on the user relationship chain as well as user's information which does not belong to the user relationship chain. The user's information may include, but not limited to, one or more portraits and one or more user names.

Step 103: providing by the server, the verified user information set to the terminal in order to subsequently receive selected user's information returned by the terminal.

Step 104: determining by the server, whether the received selected user's information from the terminal matches the user's information on the user relationship chain.

Step 105: if the selected user's information received from the terminal matches the user's information on the user relationship chain, confirming by the server, that the identity verification being successful.

Using the method provided, verified user information set containing multiple users' information may be provided in a user relationship chain. In order to successfully passing the identity verification, the only requirement may be that the selected user's information received from the terminal (200A) may match the user's information within the user relationship chain. The method disclosed in the embodiment may require less user intervention and is more flexible accordingly.

In another embodiment, the user's information in the verified user information set may contain a plurality of portraits and a plurality of user names; wherein the determining of whether the selected user's information received from the terminal matches the user's information on the user relationship chain may include:

selecting at the terminal, a portrait from the plurality of portraits to correspond to a user name from the plurality of user names;

determining by the server, whether the selected portrait and the corresponding selected user name pertain to a same user, and whether the same user belongs to the user relationship chain;

if the selected portrait and the corresponding selected user name pertains to the same user and the same user belongs to the user relationship chain: confirming by the server that the selected user's information received from the terminal matches the user's information on the user relationship chain;

if the selected portrait and the corresponding selected user name do not pertain to the same user, yet the selected user name belongs to the user relationship chain: confirming by the server that the selected user's information does not match the user's information on the user relationship chain.

In another embodiment, the user's information in the verified user information set may contain a plurality of portraits; wherein the determining of whether the selected user's information received from the terminal matches the user's information on the user relationship chain may include:
  selecting at the terminal, a portrait from the plurality of portraits;
  determining whether the selected portrait pertains to a user on the user relationship chain;
  if the selected portrait pertains to the user on the user relationship chain, confirming that the selected user's information received from the terminal matches the user's information on the user relationship chain;
  if the selected portrait does not pertain to the user on the user relationship chain, confirming that the selected user's information does not match the user's information on the user relationship chain.

In another embodiment, the user's information in the verified user information set may contain a plurality of user names; wherein the determining of whether the selected user's information received from the terminal matches the user's information on the user relationship chain may include:
  selecting at the terminal, a user name from the plurality of user names;
  determining whether the selected user name pertains to a user on the user relationship chain;
  if the selected user name pertains to a user on the user relationship chain, confirming that the selected user's information received from the terminal matches the user's information on the user relationship chain;
  if the selected user name does not pertain to the user on the user relationship chain, confirming that the selected user's information does not match the user's information on the user relationship chain.

In another embodiment, the method may further include: if the selected user's information does not match the user's information on the user relationship chain, prompting a re-verification and performing the step of obtaining the verified user's information set.

In another embodiment, the method further include: when verification fails and the number of verification times exceeds the preset value, ignoring any identity verification request received within the preset timeframe for the specified user information.

In another embodiment, the verified user information set may further contain the user's information that does not belong to the user relationship chain.

In another embodiment, the method may further include: triggering an identity verification process upon detecting anyone of:
  that a number of login attempts made during a preset timeframe exceeds a preset value;
  that the user name and password used for the current login do not match; or
  that the user name used for the current login is not among the history login user names used on the current terminal.

Figure 2:
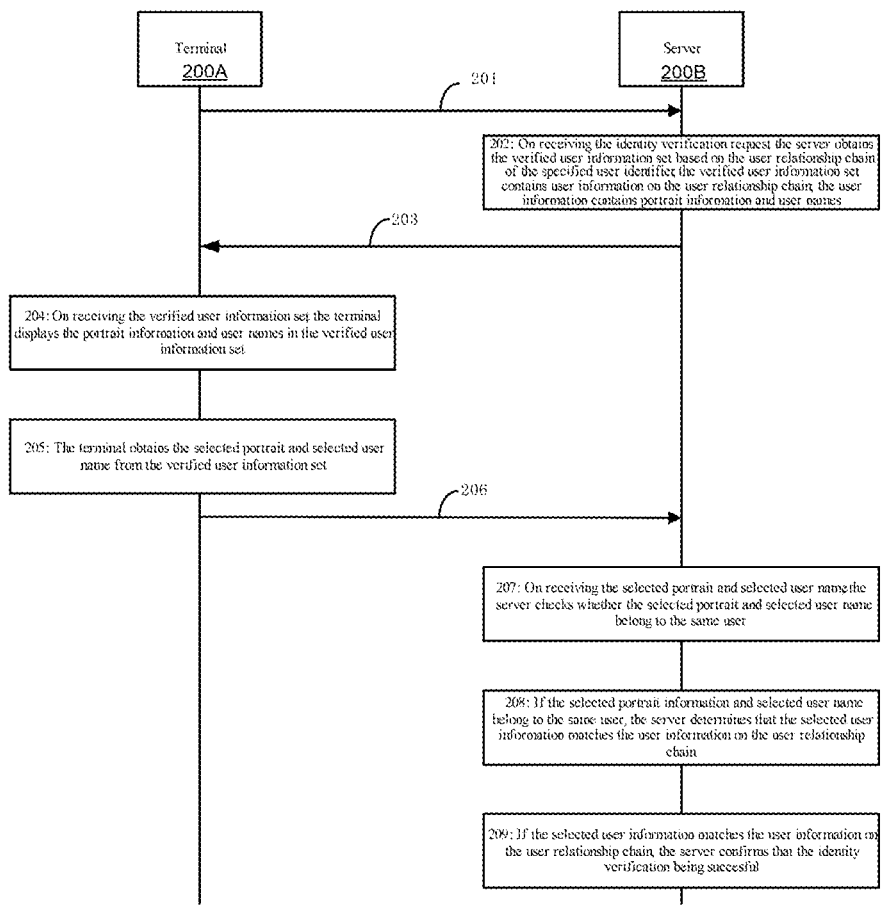
FIG. 2 shows a flowchart of an exemplary identity verification method, according to another embodiment of the present disclosure.

FIG. 2 shows a flowchart of an exemplary identity verification method, according to another embodiment of the present disclosure. In FIG. 2, assuming that the user's information in the verified user information set may contain a plurality of portraits and a plurality of user names. The method may execute the following operations:

Step 201: The terminal (200A) may send to the server (200B) an identity verification request that contains a specified user identifier. More specifically, the terminal (200A) may send an identity verification request to the server (200B) upon detecting any of the following events:

(1) Upon detecting that the number of login attempts made during the preset timeframe exceeds a preset value within a preset time frame. That is, if frequent attempts are made to log in to the application by using the current user name, the terminal (200A) may consider that the current login is abnormal and may send an identity verification request to the server for further identity verification.

(2) When the server (200B) detects that a user name and a corresponding password used for the current login do not match, the terminal (200A) may be considered as in an abnormal login and may be instructed to send an identity verification request to the server (200B). In a special scenario, the user of the terminal (200A) may have forgotten his or her password, therefore the terminal (200A) may send an identity verification request to the server (200B) in order that an identity verification is performed. Other scenarios may happen, which will not be discussed here.

(3) Upon detecting that the current user has entered a user name and the login procedure has been triggered, the terminal (200A) may send an identity verification request to the server (200B). That is, when a user logs in to an application for an identity verification, identity verification may be performed by using other methods which may not be limited to the method of only matching between the user name and password. In effect, this embodiment may enable a user to log in without having to remember the login password.

(4) Upon detecting that the user name used for the current login may not be among the history login user names used on the current terminal, that is, no login using the user name for the current login may be completed on the current terminal, the terminal (200A) may consider the current login as abnormal and may send an identity verification request to the server (200B) for further identity verification.

(5) Upon receiving an authorization token sent by the server (200B) when the verification using a user name and a password being successful, the terminal (200A) may send an identity verification request to the server (200B). Each time a user logs in to the application, the terminal (200A) may perform verification twice to prevent someone to attempt a login using a hijacked user name and password.

In actual implementation, after the server (200B) receives a login request from the terminal (200A), and assuming that the verification of the user name and password carried in the login request being successful, the identity verification process provided by the present embodiment may be performed. In other words, irrespective of whether the user name and the password match or not, the terminal (200A) would be required to perform the identity verification process provided by the present embodiment.

Figure 3:
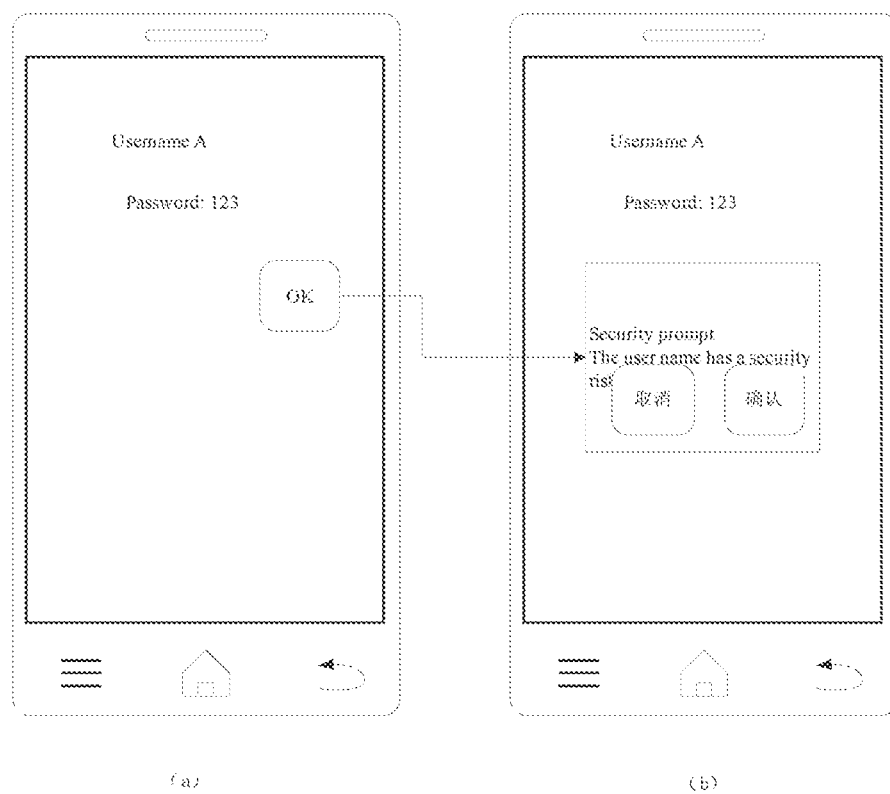
FIG. 3 shows an exemplary display interface diagram of a user terminal implementing the identity verification method, according to an embodiment of the present disclosure.

In another embodiment, when the terminal detects any of the above-mentioned events (1) to (5), a display interface screen shot page as shown in FIG. 3(a) and FIG. 3(b) may be displayed. A terminal may be shown in FIG. 3 (a), when tapping of a login button may be detected, the screen shot page as shown in FIG. 3 (b) may be displayed. In this case, the login screen shot page may be frozen, and no login may be performed. A message "The user name has a security risk" may be displayed on the terminal. When tapping of the "OK" button is detected, the terminal may sends an identity verification request to the server.

Step 202: Upon receiving the identity verification request, the server (200B) may obtain the verified user information set based on the user relationship chain of the specified user identifier. The verified user information set may contain the user's information on the user relationship chain; the user's information may contain one or more portraits and one or more user names.

In the present embodiment, it may be assumed that the verified user information set may contain only the user's information on the user relationship chain. In another embodiment of the present disclosure, the verified user information set may contain the user's information on the user relationship chain as well as the user's information which does not belong to the user relationship chain. The content of the user relationship chain is not limited by the present embodiment.

Wherein, the verified user information set may contain a preset number of pieces of user's information among the multiple pieces of user's information on the user relationship chain, instead of the entire user's information on the user relationship chain in order to accelerate identity verification. The preset number may be set by a technical personnel, which preset number is not limited by the present embodiment.

In the present embodiment, multiple user identifiers and the user relationship chain of each user identifier may be stored on the server. Upon receiving the identity verification request, the server may search for the user relationship chain corresponding to the specified user identifier based on the specified user identifier carried in the identity verification request and obtain a portrait and a user name that correspond to a same user from the user relationship chain. The number of users obtained may be set to the first preset number.

Step 203: The server (200B) sends the verified user information set to the terminal (200A) so that identity verification may be subsequently performed on the basis of only the verified user's information set, without the need of any additional auxiliary tool, thus requiring minimal user intervention and is highly flexible.

Step 204: On receiving the verified user's information set, the terminal (200A) displays the portrait and user names in the verified user's information set. The terminal (200A) may display multiple portraits and user names in a random sequence, allowing the user to, from the multiple portraits and user names, select the portrait and a corresponding user name that belong to the same user.

In the present embodiment, the terminal (200A) may display an identity verification page, which may show multiple portraits and user names. The identity verification page may allow the user to confirm the information to be verified by tapping or drawing a line.

Figure 4:
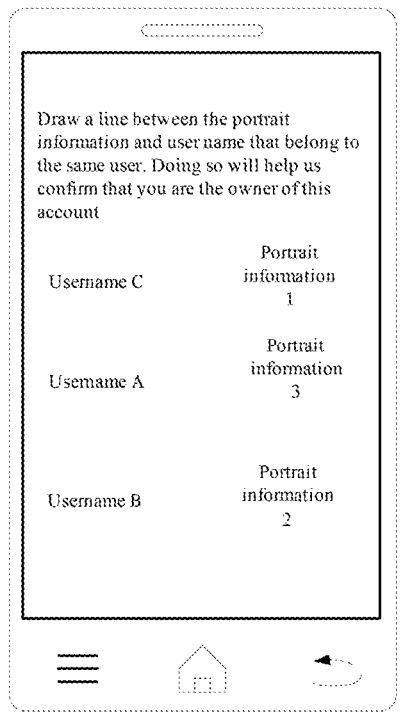
FIG. 4 shows an exemplary display interface diagram of a user terminal implementing the identity verification method, according to another embodiment of the present disclosure.

For example, as shown in FIG. 4, assuming that the matching portrait and corresponding user name may be determined by drawing a line. The message "Draw a line between the portrait and user name that belong to the same user. Doing so will help us confirm that you are the owner of this account", three user names, and three portraits may be displayed on the current page. In this case, a line may need to be drawn between the portrait and a corresponding user name that belong to the same user.

Step 205: The terminal (200A) may obtain the selected portrait and selected user name from the verified user's information set. The user's information in the verified user information set is the user's information on the relationship chain corresponding to the current user identifier. If the selected portrait and the selected corresponding user name belong to the same user, it may be considered that the current user is the owner of the current user name. If the selected portrait and user name do not belong to the same user, it may be considered that the current user is not the owner the current user name. Thus, identity verification using a hijacked user name and password may be prevented effectively, and the objective of identity verification may be achieved.

In another embodiment, based on the sequence of the tapping performed by the user, the terminal (200A) may obtain the tapped portrait and user name, one after the other, as a pair of information to be verified; or, based on the sliding operation performed by the user, the terminal may obtain the portrait and a corresponding user name, which may respectively correspond to the start point and end point of the sliding operation, as a pair of information to be verified.

It should note that, the terminal (200A) may obtain multiple pairs of selected portraits and user names, with each pair containing the selected portrait and user name. For example, as shown in FIG. 4, the selected portraits and corresponding user names obtained by the terminal may be the user name C and portrait 1, user name A and portrait 3, and user name B and portrait 2, respectively.

Step 206: The terminal (200A) may send the selected portrait and selected user name to the server (200B), so that the server (200B) may check whether the selected portrait and selected user name may belong to the same user.

It may be assumed that the user relationship chain corresponding to the user identifier may be stored on the server (200B). The terminal (200A) may need to send the selected portrait and user name to the server (200b) so that the server may perform identity verification. In another embodiment of the present disclosure, the user relationship chain corresponding to the user identifier may also be stored on the terminal (200A). Upon obtaining the selected portrait and user name, the terminal (200A) itself may perform identity verification on the current user.

Step 207: upon receiving the selected portrait and selected user name, the server (200B) may check whether the selected portrait and selected user name belong to the same user. If yes, step 208 is performed; if no, the flow process may end.

In the present embodiment, upon receiving the selected portrait and selected user name, the server (200B), based on the user relationship chain of the user identifier stored on the server (200B), may determine whether both the selected portrait and selected user name correspond to the same user on the user relationship chain. If yes, the server (200B) may consider that the selected portrait and selected user name belong to the same user; if no, the server (200B) may consider that the selected portrait and selected user name do not belong to the same user.

As shown in FIG. 4, assuming that user name A and portrait 1 belong to the same user; user name B and portrait 2 belong to the same user; user name C and portrait 3 belong to the same user, respectively. If the received selected portrait and selected user name are that user name C is to correspond to portrait 1; user name A is to correspond to portrait 3; and user name B is to correspond to portrait 2, the terminal may send to the server three pairs of information to be verified: user name C and portrait 1, user name A and portrait 3, and user name B and portrait 2, respectively. The server (200B) may determine that user name C and portrait 1 do not correspond to a same user and that user name A and portrait 3 do not belong to the same user.

The verified user information set related in the present embodiment may contain only the user's information on the user relationship chain. Therefore, upon receiving the selected portrait and selected user name, the server (200B) may only need to check whether the selected portrait and selected user name belong to the same user.

In another embodiment of the present disclosure, the verified user information set may contain the user's information on the user relationship chain and also the user's information which does not belong to the user relationship chain. In this case, step 207 may be replaced by the following step: upon receiving the selected portrait and selected user name, the server (200B) may determine whether or not the selected portrait and selected user name may correspond to a same user and the same user may belong to the user relationship chain.

Step 208: If the selected portrait and selected user name belong to the same user, the server (200B) may determine that the selected user's information received from the terminal matches the user's information on the user relationship chain.

In the present embodiment, if the selected portrait and selected user name belong to the same user, the server (200B) may determine that the selected user's information received from the terminal (200A) may match the user's information on the user relationship chain. That is, the server may consider that the current user requesting identity verification being the owner of the current user name.

Step 209: If the selected user's information received from the terminal matches the user's information on the user relationship chain, the server (200B) may determine that the identity verification being successful.

If the selected user's information received from the terminal matches the user's information on the user relationship chain, the server determines that the identity verification being successful and may send an authorization token to the terminal. Thus, the terminal and the server may perform various operations based on the authorization token.

The present embodiment described may only assume that the server determines the identity verification being successful only when the correspondences between the selected multiple pairs of portrait information, user names and users are correct. In another embodiment of the present disclosure, the server (200B) may also determine that identity verification being successful when the correspondences between one or more pairs of the selected multiple pairs of portrait and user names and the users are correct.

In another embodiment, if the selected portrait and selected user name do not belong to the same user, that is, if the server (200B) determines that the selected user's information does not match the user's information on the user relationship chain, the server (200B) may perform the step of obtaining the verification information set. The user's information contained in the verification information set newly obtained may be different from that in the verification information set obtained previously.

In another embodiment, when verification fails and the number of verification times exceeds the preset value, the server may ignore any identity verification request received within the preset timeframe for the specified user information. That is, when verification has failed for multiple times, the server (200B) may freeze the user name so that the user may be unable to log in using the user name within a specified period of time.

Figure 5:
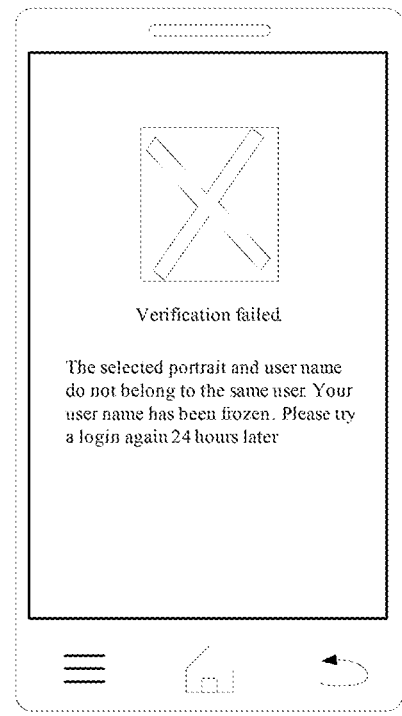
FIG. 5 shows an exemplary display interface diagram of a user terminal implementing the identity verification method, according to another embodiment of the present disclosure.

As shown in FIG. 5, when the user name is frozen, the terminal (200A) may display the message "Verification failed. The selected portrait and user name do not belong to the same user. Your user name has been frozen. Please try a login 24 hours later." If the user tries a login when the user name is frozen, the terminal (200A) may notify the user that the user name may be frozen and may indicate the length of time before the user may try a login again.

Figure 6:
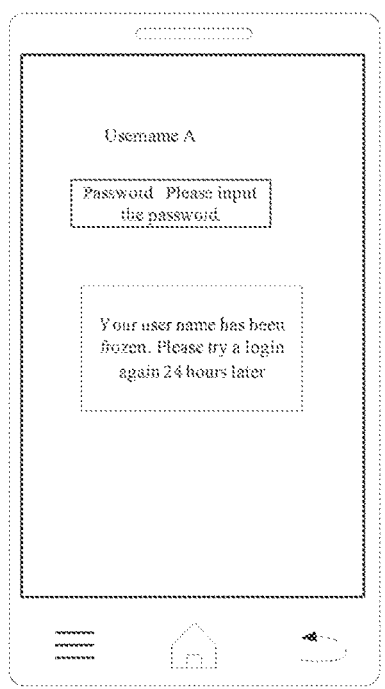
FIG. 6 shows an exemplary display interface diagram of a user terminal implementing the identity verification method, according to another embodiment of the present disclosure.

As shown in FIG. 6, when the user tries a login while the user name is frozen, the message "Your user name has been frozen. Please try a login 24 hours later." may be displayed.

Figure 7:
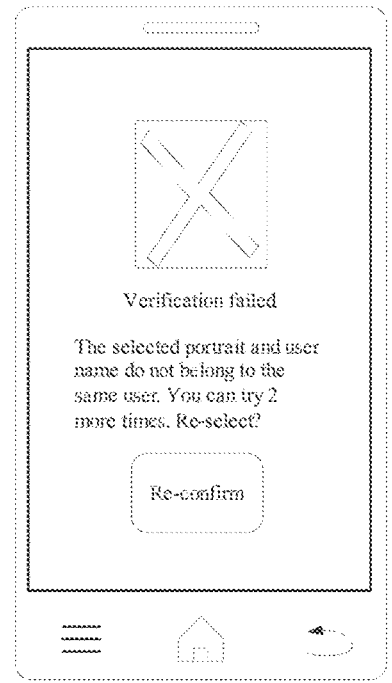
FIG. 7 shows an exemplary display interface diagram of a user terminal implementing the identity verification method, according to another embodiment of the present disclosure.

Further in another embodiment, if the server (200B) determines that the selected user's information does not match the user's information on the user relationship chain, the server (200B) may send a verification failure message to the terminal so that the terminal (200A) may indicate a failure of the current user identikit verification and the remaining allowed times of verification. As shown in FIG. 7, when verification fails, the terminal (200A) may display the message "The selected portrait and user name do not belong to the same user. You may try 2 more times. Select again?" If the current user selects Confirm Again, identity verification continues.

Note that, the above-mentioned process is described assumes that identity verification may be implemented on the basis of an interaction between the terminal (200A) and the server (200B). That is, the identity verification request mentioned in step 201 may be triggered by a user using the terminal (200A) and sent by the terminal to the server (200B). Thus, the server (200B) may perform the subsequent steps 202 to 209 based on the identity verification request.

Upon obtaining the identity verification request, the server (200B) may send the verified user information set to the terminal (200A). The terminal (200A) may perform identity verification based on the received verified user's information set. After displaying on the terminal (200A), when the user triggers any processing operation on the terminal (200A), the terminal (200A) may send the corresponding processing instruction to the server (200B) so that the server may perform identity verification based on the processing instruction. In fact, the process may also perform server-based identity verification. That is, the identity verification request mentioned in step 201 may be triggered by the user using a cloud. Thus, the server (200B) may perform the subsequent steps based on the identity verification request. After displaying on the cloud, the server (200B), upon receiving the processing operation of the user, triggers the corresponding processing instruction based on the processing operation. If a user relationship chain is stored on the terminal (200A), steps 201 to 209 may also be performed. Thus, the verified user information set is displayed and subsequent processing performed on the terminal (200A).

Using the method provided the embodiments of the present disclosure, a verified user information set containing multiple pieces of user's information may be provided on the basis of the user's information on a user relationship chain. Identity verification may be successful when the selected user's information received from the terminal matches the user's information on the user relationship chain. In this regard, identity verification in the disclosed method requires minimal user intervention and is quite flexible.

Figure 8:
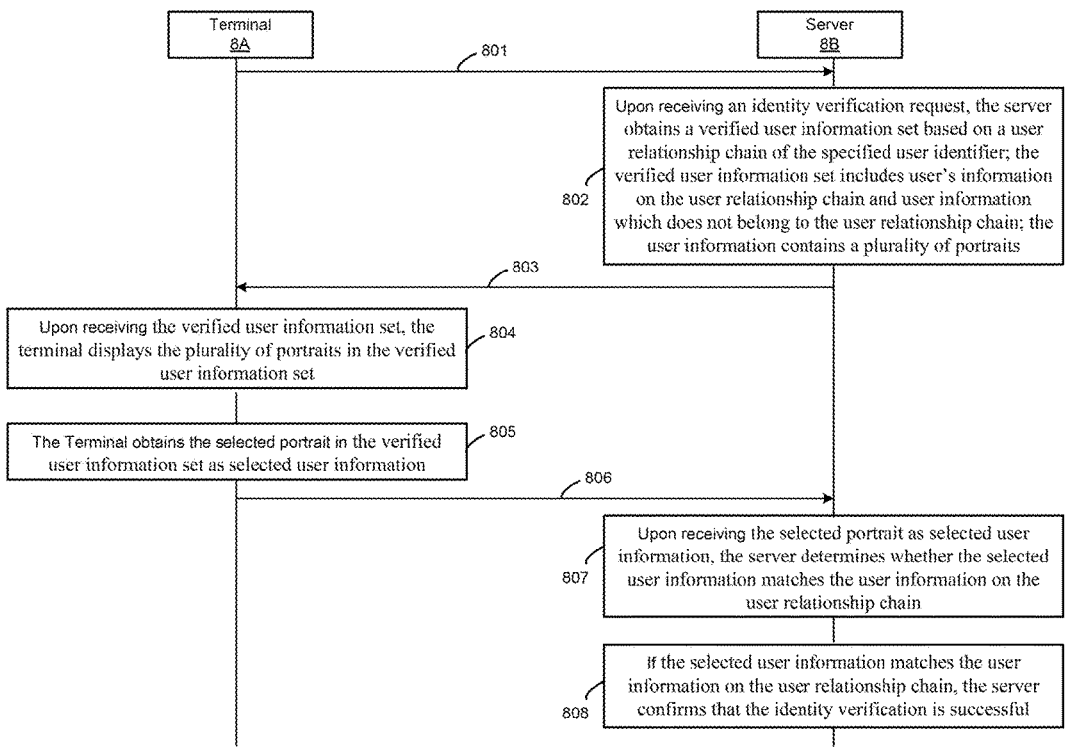
FIG. 8 shows an exemplary flowchart of the identity verification method provided by the embodiments of the present disclosure.

FIG. 8 shows an exemplary flowchart of the identity verification method provided by the embodiments of the present disclosure. The embodiment as shown in FIG. 8 may assume that the verified user information set contains only portrait information. The embodiment may include the following steps:

Step 801: The terminal (8A) may send to the server (8B) an identity verification request that contains a specified user identifier. The implementation mode of step 801 may be similar to that of step 201 in FIG. 2. For details, please refer to the description of step 201.

Step 802: Upon receiving an identity verification request, the server (8B) obtains a verified user information set based on a user relationship chain of the specified user identifier; the verified user information set includes user's information on the user relationship chain and user information which does not belong to the user relationship chain; the user information contains a plurality of portraits.

Wherein, the verified user information set may contain a second preset number of portraits on the user relationship chain and a third preset number of portraits that do not belong to the user relationship chain. In another embodiment, the second preset number may be smaller than the third preset number. The second preset number and the third preset number may be set by technical personnel, and its value setting is not limited by the present embodiment.

In the present embodiment, multiple user identifiers and the user relationship chain of each user identifier may be stored on the server (8B). Upon receiving the identity verification request, the server (8B), based on the specified user identifier carried in the identity verification request, may search for the user relationship chain corresponding to the specified user identifier, and obtain the second preset number of portraits on the user relationship chain and the third preset number of portraits that do not belong to the user relationship chain, thus obtaining the verified user's information set.

Step 803: The server (8B) may send the verified user information set to the terminal. The implementation mode of step 803 is similar to that of step 203. For details, please see the description of step 201.

Step 804: Upon receiving the verified user information set, the terminal displays the plurality of portraits in the verified user information set which may allow the user to, from the multiple portraits, select the portrait on the user relationship chain.

In the present embodiment, among the multiple portraits, the second preset number of portraits may belong to the user relationship chain. The present embodiment described may assume that one portrait is selected from among the multiple portraits. In another embodiment of the present disclosure, the second preset number of portraits may also be selected from multiple portraits, but not limited by the present embodiment. In addition, the fourth preset number of portraits may also be selected from the multiple portraits. The fourth preset number may be larger than 1 and smaller than the second preset number.

As shown in FIG. 9, the message "From the following 9 portraits, select a portrait that belongs to one of your friends. This will help us to confirm that you are the owner of this user name" and 9 portraits are displayed on the current page. In this case, the user may need to select a portrait which belongs to the user relationship chain from the 9 portraits.

Step 805: The terminal (8A) may obtain the selected portrait in the verified user's information set. The portrait in the verified user information set may contain the portrait on the user relationship chain and the portrait that does not belong to the user relationship chain. If the selected portrait belongs to a user on the user relationship chain, it may be considered that the current user may be the owner of the current user name. If the selected portrait does not pertain to the user on the user relationship chain, it may be considered that the current user is not the owner the current user name. Accordingly, identity verification using a hijacked user name and password may be effectively prevented, and the purpose of identity verification may be achieved.

Step 806: The terminal (8A) may send the selected portrait to the server (8B). The implementation mode of step 806 is similar to that of step 206. For details, see the description of step 206.

Step 807: Upon receiving the selected portrait as selected user information, the server determines whether the selected user information matches the user information on the user relationship chain. If yes, step 808 is performed; if no, the flow ends.

In the present embodiment, upon receiving the selected portrait information, the server (8B), based on the user relationship chain of the user identifier stored on the server, determines whether the selected user's information received from the terminal (8A) matches a user which belongs to the user relationship chain. If the selected portrait belongs to a user on the user relationship chain, the server (8B) may determine that the selected user's information received from the terminal matches the user's information on the user relationship chain. If the selected portrait does not pertain to the user on the user relationship chain, the server (8B) may determine that the selected user's information does not match the user's information on the user relationship chain.

As shown in FIG. 9, the scenario where portrait 1 belongs to a user on the user relationship chain may be used as an example. If the selected portrait received is portrait 2, the server (8B) may determine that the selected portrait does not pertain to the user on the user relationship chain.

Step 808: If the selected user's information received from the terminal matches the user's information on the user relationship chain, the server may confirm that the identity verification being successful. The implementation mode of step 808 is similar to that of step 209. For details, see the description of step 206.

In another embodiment, if the selected portrait does not pertain to the user on the user relationship chain, that is, if the server determines that the selected user's information does not match the user's information on the user relationship chain, the server performs the step of obtaining the verification information set. The user's information contained in the verification information set newly obtained may be different from that in the verification information set obtained previously.

In another embodiment, the implementation mode where the selected user's information does not match the user's information on the user relationship chain may be similar to the implementation mode of step 209. For details, see the description of step 209.

Note that in the present embodiment, only the scenario where the user's information in the verified user information set contains portrait may be described as an example. In this case, the current user may needs to, from multiple portraits, select the user's information that belongs to the user relationship chain for identity verification. In another embodiment of the present disclosure, the user's information in the verified user information set may contain user names. In this case, the current user may needs to, from multiple user names, select a user that belongs to the user relationship chain for identity verification, not limited by the present embodiment.

Using the method provided the embodiments of the present disclosure, verified user information set containing multiple pieces of user's information may be provided on the basis of the user's information on a user relationship chain. The identity verification being successful when the selected user's information received from the terminal may match the user's information on the user relationship chain, so it requires little user intervention and is very flexible.

FIG. 10 shows an exemplary structural diagram of an identity verification device (1000), according to an embodiment of the present disclosure. The device may be installed and operate within a server (such as server (200B or 8B) in FIGS. 2 and 8), or installed within a terminal (such as terminal (200A or 8A) in FIGS. 2 and 8). As shown in FIG.

10, the device (1000) may include at least a processor with circuitry (1007) operating in conjunction with at least a memory (1008) storing codes to be executed as a plurality of modules or units to perform functions, wherein the plurality of modules or units may include:

- a verification request receiving module (1001), which causes the device (1000) to receive an identity verification request sent from a terminal, where the identity verification request contains a specified user identifier;
- a user's information set acquisition module (1002), which is connected to the verification request receiving module (1001). The user's information set acquisition module (1002), based on a user relationship chain of the specified user identifier, causes the device to obtain a verified user information set, wherein the verified user information set includes user's information on the user relationship chain;
- a user's information set providing module (1003), which causes the device to provide the verified user's information set to the terminal in order to subsequently receive selected user's information returned by the terminal;
- a determining module (1004), which causes the device to determine whether the received selected user's information from the terminal matches the user's information on the user relationship chain;
- a verification passing module (1005), which causes the device to, if the selected user's information received from the terminal matches the user's information on the user relationship chain, confirm that the identity verification being successful.

In another embodiment, the user's information in the verified user information set may contain a plurality of portraits and plurality of user names. The determining module (1004) may include a first determining unit, which causes the device to determine whether the selected portrait and the corresponding selected user name pertain to a same user, and whether the same user belongs to the user relationship chain: if the selected portrait and the corresponding selected user name pertains to the same user and the same user belongs to the user relationship chain: the first determination unit causes the device to confirm that the selected user's information received from the terminal matches the user's information on the user relationship chain; if the selected portrait and the corresponding selected user name do not pertain to the same user, yet the selected user name belongs to the user relationship chain: the first determination unit further causes the device to confirm that the selected user's information does not match the user's information on the user relationship chain.

In another embodiment, the verified user information set may contain a plurality of portraits, and wherein after receiving from the terminal a selection of a portrait from the plurality of portraits, wherein the determining module (1004) may include: a second determining unit, which causes the device to determine whether the selected portrait pertains to a user on the user relationship chain: if the selected portrait pertains to the user on the user relationship chain, confirm that the selected user's information received from the terminal matches the user's information on the user relationship chain; if the selected portrait does not pertain to the user on the user relationship chain, confirm that the selected user's information does not match the user's information on the user relationship chain.

In another embodiment, the user's information in the verified user information set contains a plurality of user names, and wherein after receiving from the terminal a selection of a user name from the plurality of user names, wherein the determining module (1004) may include: a third determining unit, which causes the device to determine whether the selected user name pertains to a user on the user relationship chain: if the selected user name pertains to a user on the user relationship chain, confirm that the selected user's information received from the terminal matches the user's information on the user relationship chain; if the selected user name does not pertain to the user on the user relationship chain, confirm that the selected user's information does not match the user's information on the user relationship chain.

In another embodiment, the device (1000) further includes a verification request receiving module which when the re-verification fails and a number of verification times exceeds a preset value, causes the device to ignore any identity verification request received within a preset timeframe for the specified user information.

In another embodiment, the device (1000) further includes: a verification request receiving module which when the re-verification fails and a number of verification times exceeds a preset value, causes the device to ignore any identity verification request received within a preset timeframe for the specified user information.

In another embodiment, the verified user information set may further contain the user's information that does not belong to the user relationship chain.

In another embodiment, the device (1000) may trigger an identity verification process upon detecting anyone of: when a number of login attempts made during a preset timeframe exceeds a preset value; when the user name and password used for the current login do not match; or when the user name used for the current login is not among the history login user names used on the current terminal.

The identity verification performed by the identity verification device (1000) is for illustration only. In actual application, the above-mentioned functions may be assigned to different function modules for completion as needed. That is, the internal structure of the device may be divided into different function modules to complete all or some of the above-mentioned functions. In addition, the identity verification device and identity verification method provided by the above-mentioned embodiment adopt the same concept. For implementation details, see the description of the method provided by the above-mentioned embodiment.

Figure 11:
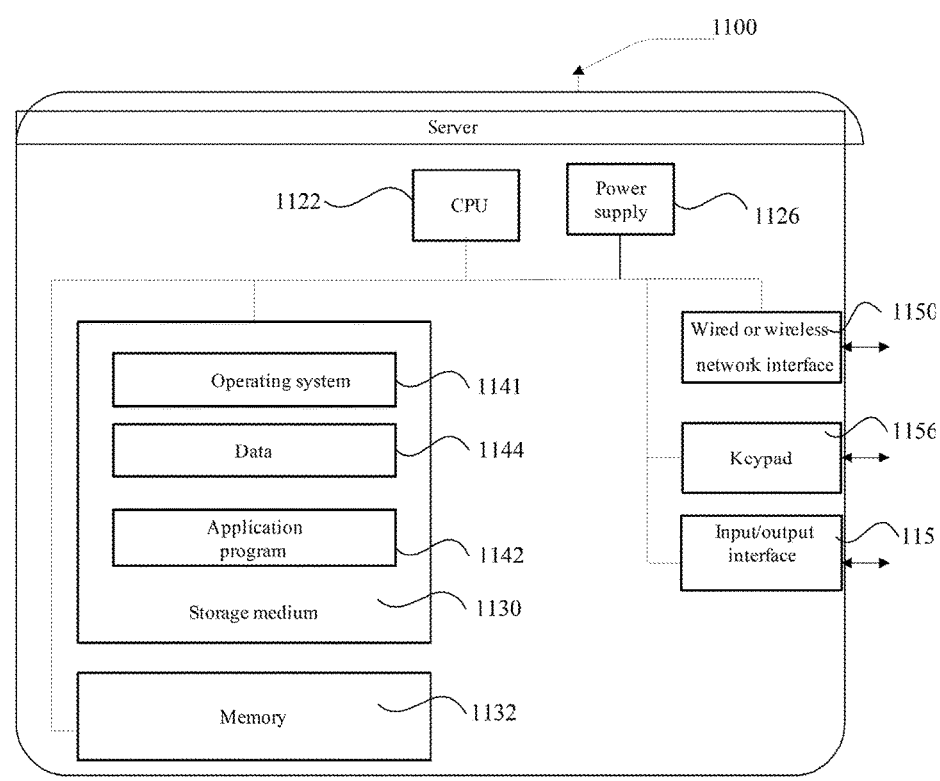
FIG. 11 shows an exemplary structural diagram of a server implementing the identity verification method, according to another embodiment of the present disclosure.

FIG. 11 shows an exemplary structural diagram of a server (1100) implementing the identity verification method, according to another embodiment of the present disclosure. As shown in FIG. 11, the server (1100) may be which causes the device (1000) to implement the identity verification method as provided by the above-mentioned embodiments.

The server 1100 may vary significantly depending on configurations and performance. The server (1100) may include one or more central processing units (CPUs) (1122) (for example, one or more processors), a memory (1132), and one or more storage media (1130) (for example, one or more mass storage devices) which causes the device (1000) to store the application program (1142) or the data (1144). The memory (1132) and the storage medium (1130) may provide non-persistent storage or persistent storage. The program stored on the storage medium (1130) may comprise one or more modules (not shown in the figure), and each module may comprise a series of instruction operations on the server. Further, the CPU (1122) may be configured to communicate with the storage medium (1130) and perform on the server (1100) a series of instruction operations stored in the storage medium (1130). The server (1100) may further comprise one or more power modules (1126), one or more wired or wireless network interfaces (1150), one or more input/output interfaces (1158), one or more keypads (1156), and/or one or more operating systems (1141), such as Windows Server™, Mac OS X™, Unix™, Linux™, and FreeBSD™. The steps performed by the server provided in the embodiments as shown in FIG. 1, FIG. 2, and FIG. 8 may be based on the server (1100) structure as shown in FIG. 11.

The modules and units described as separate parts may be or may not be physically separated, and parts displayed as units may be or may not be physical units, that is, they may be located at the same place or be distributed on multiple network units. Some or all of the modules may be selected as needed to attain the objectives of this embodiment. A person with ordinary skills in the art may understand and carry out it without inputting creative effort.

The sequence numbers of the above-mentioned embodiments may be intended only for description, instead of indicating the relative merits of the embodiments. It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands may enable a computer, a server, a smart phone, a tablet or any similar computing device to perform identity Verification operations.

What is claimed is:

1. An identity verification method, comprising:
   receiving by a server, an identity verification request sent from a terminal, where the identity verification request contains a specified user identifier;
   based on a user relationship chain of the specified user identifier, obtaining by the server, a verified user information set which includes information of a plurality of other users for forming the user relationship chain after subsequent selection, wherein the information of the plurality of other users in the verified user information set contains a first preset number of plurality of portraits and names of the plurality of other users who belong to the user relationship chain and a second preset number of plurality of portraits and names of the plurality of other users who do not belong to the user relationship chain;
   receiving from the terminal, selected user's information through tapping on a user interface display, selected respective plurality of matched pairs of each and every respective portrait from the plurality of portraits to correspond to each and every respective name from the names of the plurality of other users; and
   determining by the server, whether the selected respective plurality of matched pairs in the received selected user's information from the terminal matches the verified user's information on the user relationship chain;
   if the selected user's information received from the terminal matches the verified user's information on the user relationship chain, confirming by the server, that the identity verification request sent from the terminal being successful, and
   if the selected user's information does not match the verified user's information on the user relationship chain, prompting a re-verification by obtaining a newly verified user's information set which is different from previously obtained verified user's information, wherein the newly verified user's information set consists of different respective plurality of matched pairs of each and every respective different portrait to correspond to each and every respective different name on the user relationship chain.

2. The method according to claim 1, wherein the determining of whether the selected user's information received from the terminal matches the verified user's information on the user relationship chain comprises:
   determining by the server, whether the selected portrait and the corresponding selected user name pertain to a same user, and whether the same user belongs to the user relationship chain; and
   if the selected portrait and the corresponding selected user name pertains to the same user and the same user belongs to the user relationship chain: confirming by the server that the selected user's information received from the terminal matches the verified user's information on the user relationship chain;
   if the selected portrait and the corresponding selected user name do not pertain to the same user, yet the selected user name belongs to the user relationship chain: confirming by the server that the selected user's information does not match the verified user's information on the user relationship chain.

3. The method according to claim 1, wherein the verified user's information in the verified user information set contains a plurality of portraits; wherein the determining of whether the selected user's information received from the terminal matches the verified user's information on the user relationship chain comprises:
   selecting through connecting the drawn line at the terminal, the each and every respective portrait from the plurality of portraits to the each and every respective name from the plurality of other users;
   determining whether the selected respective plurality of matched pairs of each and every respective portrait pertains to the each and every respective name from the plurality of other users on the user relationship chain;
   if pertains to the each and every respective name from the plurality of other users on the user relationship chain, confirming that the selected user's information received from the terminal matches the verified user's information on the user relationship chain;
   if does not pertain to the each and every respective name from the plurality of other users on the user relationship chain, confirming that the selected user's information does not match the verified user's information on the user relationship chain.

4. The method according to claim 3, wherein the method further comprises:
   if the selected user's information does not match the verified user's information on the user relationship chain, prompting a re-verification and performing the step of obtaining the verified user's information set.

5. The method according to claim 4, wherein the method further comprises:
   when the re-verification fails and a number of verification times exceeds a preset value, ignoring any identity verification request received within a preset timeframe for the specified user information.

6. The method according to claim 1, wherein the first preset number is not equal to the second preset number.

7. The method according to claim 1, wherein the method further comprises triggering an identity verification process upon detecting anyone of:
- when a number of login attempts made during a preset timeframe exceeds a preset value;
- when the user name and password used for the current login do not match; or
- when the user name used for the current login is not among the history login user names used on the current terminal.

8. An identity verification device, comprises at least a processor with circuitry operating in conjunction with at least a memory storing codes to be executed as a plurality of modules or units to perform functions, wherein the plurality of modules or units comprise:
- a verification request receiving module, which causes the device to receive an identity verification request sent from a terminal, where the identity verification request contains a specified user identifier;
- a user's information set acquisition module, which is based on a user relationship chain of the specified user identifier, causes the device to obtain a verified user information set, wherein the verified user information set includes information of a plurality of other users for forming the user relationship chain after subsequent selection, wherein the information of the plurality of other users in the verified user information set contains a first preset number of plurality of portraits and names of the plurality of other users who belong to the user relationship chain and a second preset number of plurality of portraits and names of the plurality of other users who do not belong to the user relationship chain;
- a user's information set providing module, which causes the device to provide the verified user's information set to the terminal in order to subsequently receive selected user's information returned by the terminal, wherein the selected user's information received through tapping on a user interface display of the terminal, selected respective plurality of matched pairs of each and every respective portrait from the plurality of portraits to correspond to each and every respective name from the names of the plurality of other users;
- a determining module, which causes the device to determine whether the selected respective plurality of matched pairs in the received selected user's information from the terminal matches the verified user's information on the user relationship chain; and
- a verification passing module, which causes the device to, if the selected user's information received from the terminal matches the verified user's information on the user relationship chain, confirm that the identity verification request sent from the terminal being successful, and
if the selected user's information does not match the verified user's information on the user relationship chain, prompting a re-verification by obtaining a newly verified user's information set which is different from previously obtained verified user's information, wherein the newly verified user's information set consists of different respective plurality of matched pairs of each and every respective different portrait to correspond to each and every respective different name on the user relationship chain.

9. The device according to claim 8, wherein the determining module comprises:
- a first determining unit, which causes the device to determine whether the selected portrait and the corresponding selected user name pertain to a same user, and whether the same user belongs to the verified user on the relationship chain:
  if the selected portrait and the corresponding selected user name pertains to the same user and the same user belongs to the verified user on the user relationship chain: the first determination unit causes the device to confirm that the selected user's information received from the terminal matches the verified user's information on the user relationship chain;
  if the selected portrait and the corresponding selected user name do not pertain to the same user, yet the selected user name belongs to the user relationship chain: the first determination unit further causes the device to confirm that the selected user's information does not match the verified user's information on the user relationship chain.

10. The device according to claim 8, wherein the verified user's information in the verified user information set contains a plurality of portraits, and wherein after receiving from the terminal a selection of a portrait from the plurality of portraits, wherein the determining module comprises:
- a second determining unit, which causes the device to determine whether the selected respective plurality of matched pairs of each and every respective portrait pertains to the each and every respective name from the plurality of other users on the user relationship chain;
  if pertains to, confirming that the selected user's information received from the terminal matches the verified user's information on the user relationship chain;
  if does not pertain to, confirming that the selected user's information does not match the verified user's information on the user relationship chain.

11. The device according to claim 8, wherein the device further comprises:
- a re-verification module, which if the selected user's information does not match the verified user's information on the user relationship chain, causes the device to, prompt re-verification and performing the step of obtaining the verified user's information set.

12. The device according to claim 11, wherein the device further comprises:
- a verification request receiving module which when the re-verification fails and a number of verification times exceeds a preset value, causes the device to ignore any identity verification request received within a preset timeframe for the specified user information.

13. The device according to claim 8, wherein the first preset number is not equal to the second preset number.

14. The device according to claim 8, wherein the device triggers an identity verification process upon detecting anyone of:
- when a number of login attempts made during a preset timeframe exceeds a preset value;
- when the user name and password used for the current login do not match; or
- when the user name used for the current login is not among the history login user names used on the current terminal.

15. A non-transitory computer-readable storage medium, wherein the computer readable storage medium stores a program which comprises codes or instructions to cause a processor circuitry to execute operations for identity verification, the operations comprising:
- based on a user relationship chain of the specified user identifier, obtaining by the server, a verified user information set which includes information of a plurality of other users for forming the user relationship chain after subsequent selection, wherein the information of the plurality of other users in the verified user information set contains a first preset number of plurality of portraits and names of the plurality of other users who belong to the user relationship chain and a second preset number of plurality of portraits and names of the plurality of other users who do not belong to the user relationship chain;

receiving from the terminal, selected user's information through tapping on a user interface display, selected respective plurality of matched pairs of each and every respective portrait from the plurality of portraits to correspond to each and every respective name from the names of the plurality of other users; and determining by the server, whether the selected respective plurality of matched pairs in the received selected user's information from the terminal matches the verified user's information on the user relationship chain;

if the selected user's information received from the terminal matches the verified user's information on the user relationship chain, confirming by the server, that the identity verification request sent from the terminal being successful, and if the selected user's information does not match the verified user's information on the user relationship chain, prompting a re-verification by obtaining a newly verified user's information set which is different from previously obtained verified user's information, wherein the newly verified user's information set consists of different respective plurality of matched pairs of each and every respective different portrait to correspond to each and every respective different name on the user relationship chain.

16. The non-transitory computer readable storage medium according to claim 15, wherein the determining of whether the selected user's information received from the terminal matches the verified user's information on the user relationship chain comprises:

determining by the server, whether the selected portrait and the corresponding selected user name pertain to a same user, and whether the same user belongs to the user relationship chain; and if the selected portrait and the corresponding selected user name pertains to the same user and the same user belongs to the user relationship chain: confirming by the server that the selected user's information received from the terminal matches the verified user's information on the user relationship chain;

if the selected portrait and the corresponding selected user name do not pertain to the same user, yet the selected user name belongs to the user relationship chain: confirming by the server that the selected user's information does not match the verified user's information on the user relationship chain.

17. The non-transitory computer readable storage medium according to claim 16, wherein the operations further comprises:

if the selected user's information does not match the verified user's information on the user relationship chain, prompting a re-verification and performing the step of obtaining the verified user's information set.

18. The non-transitory computer readable storage medium according to claim 17, wherein the operations further comprises:

when the re-verification fails and a number of verification times exceeds a preset value, ignoring any identity verification request received within a preset timeframe for the specified user information.

19. The non-transitory computer readable storage medium according to claim 15, wherein the first preset number is not equal to the second preset number.

20. The non-transitory computer readable storage medium according to claim 15, wherein the method further comprises triggering an identity verification process upon detecting anyone of:

when a number of login attempts made during a preset timeframe exceeds a preset value;

when the user name and password used for the current login do not match; or when the user name used for the current login is not among the history login user names used on the current terminal.

* * * * *